United States Patent
Sakaguchi et al.

(10) Patent No.: US 7,712,498 B2
(45) Date of Patent: May 11, 2010

(54) RUN FLAT TIRE (75) Inventors: Tetsuya Sakaguchi, Kobe (JP); Yasuo Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 28 days.

(21) Appl. No.: 11/283,961

(22) Filed: Nov. 22, 2005

(65) Prior Publication Data
US 2006/0162837 A1 Jul. 27, 2006

(30) Foreign Application Priority Data
Jan. 24, 2005 (JP) .............................. 2005-015307

(51) Int. Cl.
B60C 17/00 (2006.01)
B60C 17/04 (2006.01)
B60C 9/18 (2006.01)
B60C 9/22 (2006.01)

(52) U.S. Cl. .................. 152/516; 152/520; 152/526; 152/531; 152/533; 152/535; 152/536; 152/538

(58) Field of Classification Search ................ 152/516, 152/517, 526, 230, 531, 533, 534, 535, 536, 152/537, 538, 520
See application file for complete search history.

(56) References Cited

U.S. PATENT DOCUMENTS

| | | | |
|---|---|---|---|
| 5,427,176 A | 6/1995 | Hayashi et al. | |
| 5,772,810 A * | 6/1998 | Cluzel | 152/531 |
| 6,142,204 A | 11/2000 | Omoteda et al. | |
| 6,230,773 B1 * | 5/2001 | Sandstrom et al. | 152/517 |
| 6,237,661 B1 | 5/2001 | Asano | |
| 6,672,351 B1 | 1/2004 | Gerresheim et al. | |
| 2001/0008158 A1 | 7/2001 | Kojima et al. | |
| 2002/0014295 A1 | 2/2002 | Tanaka | |
| 2004/0250936 A1 | 12/2004 | Morioka et al. | |

FOREIGN PATENT DOCUMENTS

DE    3324522    *   1/1985

(Continued)

OTHER PUBLICATIONS

Machine translation of DE 4209817 (published Sep. 30, 1993).*

(Continued)

*Primary Examiner*—Justin Fischer
(74) *Attorney, Agent, or Firm*—Birch, Stewart, Kolasch & Birch, LLP (57) ABSTRACT

A flat tire (2) according to the present invention includes a load support layer (12) positioned on an inside in an axial direction of a sidewall (6). The tire (2) further includes a belt (14) constituted by an inner belt ply (40) and an outer belt ply (42), and a full band (16) substantially covering a whole surface on an outside in a radial direction of the belt (14). The full band (16) is formed by a cord and a topping rubber. When a tensile load of 50N is applied, the cord has an elongation of 3.0% or less. The tire (2) may include a center band which has a smaller width in the axial direction than the width of the full band (16) and is laminated on the full band (16) in the vicinity of an equator (CL).

6 Claims, 5 Drawing Sheets

FOREIGN PATENT DOCUMENTS

| | | | |
|---|---|---|---|
| DE | 4209817 | * | 9/1993 |
| EP | 0 412 776 A2 | | 2/1991 |
| EP | 0 911 188 A1 | | 4/1999 |
| JP | 61275005 | | 12/1986 |
| JP | 4-31107 | * | 2/1992 |
| JP | 4-154411 A | | 5/1992 |
| JP | 6-191243 A | | 7/1994 |
| JP | 08-142226 | * | 6/1996 |
| JP | 11-115421 A | | 4/1999 |
| JP | 2000-43518 A | | 2/2000 |
| JP | 2000-108618 A | | 4/2000 |
| JP | 2002-12004 A | | 1/2002 |
| JP | 2002-502338 A | | 1/2002 |
| JP | 2002-301916 A | | 10/2002 |
| JP | 2002301914 | * | 10/2002 |
| JP | 2004262269 | * | 9/2004 |
| JP | 2004-322718 A | | 11/2004 |
| WO | WO-98/54014 A1 | | 12/1998 |

OTHER PUBLICATIONS

Machine translation of JP 2004-322718, 2004.*

* cited by examiner

RUN FLAT TIRE

This application claims priority on Patent Application No. 2005-15307 filed in JAPAN on Jan. 24, 2005, the entire contents of which are hereby incorporated by reference.

BACKGROUND OF THE INVENTION

1. Field of the Invention

The present invention relates to a run flat tire which can run some distance also in a state in which it punctures.

2. Description of the Related Art

A profile of a tire (a shape of a tread surface which is obtained on the assumption that a groove is not provided) influences the basic performances of a handling stability, a ride comfort and the like. It is necessary to determine a proper profile corresponding to the concept of the tire. Japanese Laid-Open Patent Publication No. 2002-301916 has disclosed a method of determining a tread profile using an involute function. In the profile determined by this method, a radius of curvature of the tread surface is gradually decreased from an equator of the tire toward a tread end. This profile is referred to as a CTT profile. By employing the CTT profile, it is possible to enhance various performances of the tire.

In recent years, a run flat tire comprising a load support layer on an inside of a sidewall has been developed and spread. The run flat tire is referred to as a side reinforcing type run flat tire. When the side reinforcing type run flat tire punctures so that an internal pressure is reduced, a weight of a vehicle is supported by the load support layer. The run flat tire can run some distance also in the case in which it punctures. In a vehicle having the run flat tire attached thereto, it is not necessary to always prepare a spare tire. By employing the run flat tire, it is possible to avoid the exchange of the tire in an inconvenient place. A side reinforcing type run flat tire comprising the CTT profile has been disclosed in U.S. Pat. No. 6,672,351 (Japanese Laid-Open Patent Publication No. 2001-80320).

In a general tire, a tread and a sidewall are flexed during running. In case of the side reinforcing type run flat tire, however, the flexure of the sidewall is suppressed by the influence of the load support layer. In the run flat tire, a tread is mainly flexed. The amount of flexure of the tread of the side reinforcing type run flat tire is larger than that of a general tire. The excessively great flexure of the tread inhibits a handling stability and an abrasion resistance.

In a general tire, a dimension is gradually increased by running. The dimension is increased over both a tread and a sidewall. In other words, the increase is generated in both an axial direction and a radial direction. In case of the side reinforcing type run flat tire, however, the increase in the axial direction is suppressed by the influence of the load support layer. In the run flat tire, the increase in only the radial direction is mainly generated. In the run flat tire, the profile of the tread is permanently distorted by the influence of the deviated increase. As described above, the profile of the tread greatly influences various performances of the tire. In the side reinforcing type run flat tire, various performances in the early stage of use are maintained with difficulty. When the profile is distorted in a tire employing the CTT profile, particularly, the intended performance cannot be exhibited.

It is an object of the present invention to provide a side reinforcing type run flat tire in which an excessively great flexure of a tread during running and a permanent distortion of a profile of the tread are suppressed.

SUMMARY OF THE INVENTION

A run flat tire according to the present invention comprises:
(1) a tread having an external surface forming a tread surface;
(2) a pair of sidewalls extended almost inward in a radial direction from an end of the tread;
(3) a pair of beads positioned on an almost inside in a radial direction of the sidewalls;
(4) a carcass laid between both of the beads along insides of the tread and the sidewalls;
(5) a load support layer positioned on an inside in an axial direction of the sidewalls;
(6) a belt formed by two belt plies or more and positioned on an outside in a radial direction of the carcass in the vicinity of the tread; and
(7) a full band substantially covering a whole surface on an outside in a radial direction of the belt.

It is preferable that the full band should be constituted by a cord and a topping rubber. The cord has an elongation of 3.0% or less when a tensile load of 50N is applied.

It is preferable that the run flat tire should further comprise a center band. The center band has a smaller width in an axial direction than that of the full band and is laminated on the full band in the vicinity of an equator of the tire. The center band is constituted by a cord and a topping rubber. A ratio (Wc/Wf) of a width Wc of the center band to a width Wf of the full band is equal to or higher than 0.20 and is equal to or lower than 0.80.

It is preferable that the center band should be positioned on an outside in a radial direction of the full band. An elongation of the cord of the center band is greater than that of a cord of the full band.

The full band may include an equator portion constituted by a cord and a topping rubber and positioned in the vicinity of an equator, and a shoulder portion constituted by a cord and a topping rubber and positioned on an outside in an axial direction of the equator portion. An elongation (at 50 N) of the cord of the equator portion is smaller than that of the cord of the shoulder portion. A ratio (We/Wf) of a width We of the equator portion to a width Wf of the full band is equal to or higher than 0.2 and is equal to or lower than 0.8.

The band structure described above is particularly suitable for a run flat tire in which a tread includes a profile having a radius of curvature decreased gradually outward in an axial direction from the equator.

In the run flat tire according to the present invention, the band suppresses the flexure of the tread during running. Therefore, the run flat tire is excellent in a handling stability and an abrasion resistance. In the run flat tire, the band prevents an increase in a radial direction. In the run flat tire, the permanent distortion of the profile of the tread is suppressed. Consequently, various performances in the early stage of use are maintained. In the run flat tire, drawbacks caused by the load support layer can be alimented by the belt.

DESCRIPTION OF THE PREFERRED EMBODIMENTS

The present invention will be described below in detail based on preferred embodiments with reference to the drawings.

Figure 1:
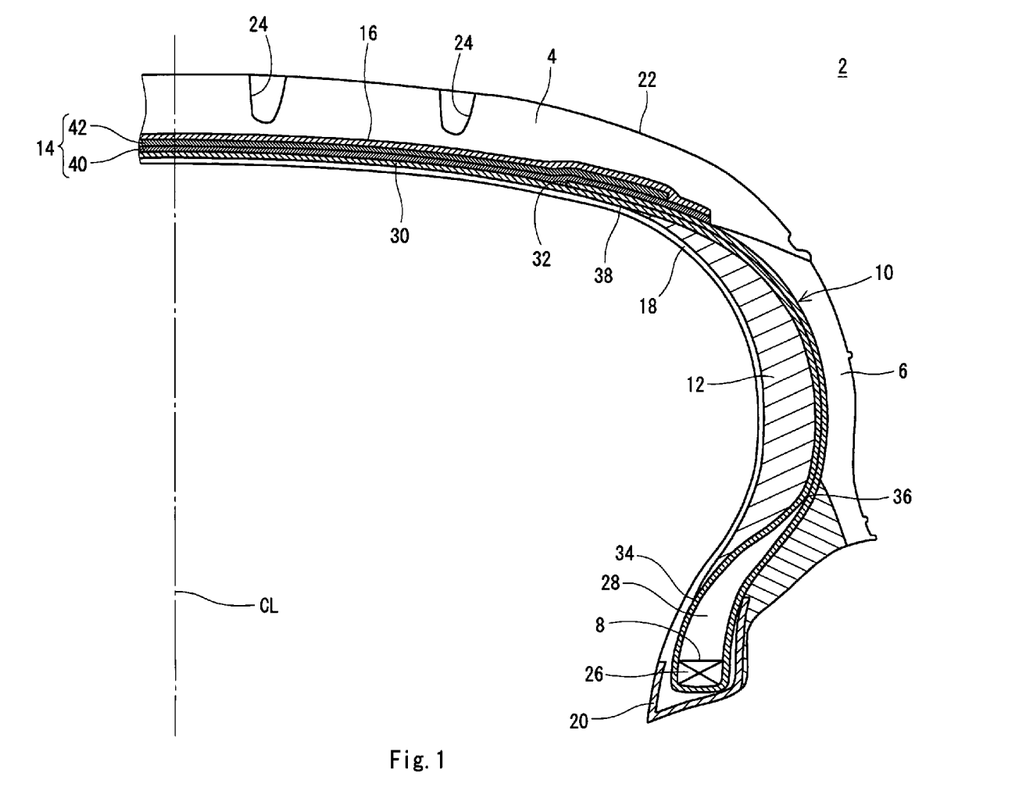
FIG. 1 is a sectional view showing a part of a run flat tire according to an embodiment of the present invention.

In FIG. 1, a vertical direction is set to be a radial direction of a tire 2, a transverse direction is set to be an axial direction of the tire 2, and a perpendicular direction to a paper is set to be a circumferential direction of the tire 2. The tire 2 takes an almost symmetrical shape about a one-dotted chain line CL in FIG. 1. The one-dotted chain line CL represents an equator plane of the tire 2. The tire 2 comprises a tread 4, a sidewall 6, a bead 8, a carcass 10, a load support layer 12, a belt 14, a full band 16, an inner liner 18, and a chafer 20. The tire 2 is a pneumatic tire of a tubeless type.

The tread 4 is formed by a crosslinked rubber and takes the shape of an outward convex in a radial direction. The tread 4 forms a tread surface 22 to come in contact with a road surface. A groove 24 is provided on the tread surface 22. A tread pattern is formed by the groove 24. The tread 4 may be constituted by an outer layer forming the tread surface 22 and an inner layer laminated on the outer layer. The tread 4 has a CTT profile. In the CTT profile, a radius of curvature of the tread surface 22 is gradually decreased from the equator CL to an end of the tread 4. The CTT profile is typically determined depending on an involute curve. The CTT profile maybe constituted by a large number of circular arcs approximated by the involute curve. The CTT profile may be determined depending on other functional curves.

The sidewall 6 is extended almost inward in the radial direction from the end of the tread 4. The sidewall 6 is formed by a crosslinked rubber. The sidewall 6 prevents the external damage of the carcass 10.

The bead 8 is positioned on an inside in a radial direction of the sidewall 6. The bead 8 includes a core 26 and an apex 28 extended outward in the radial direction from the core 26. The core 26 is ring-shaped and includes a plurality of non-extensible wires (typically, wires formed of steel). The apex 28 is outward tapered in the radial direction and is formed by a crosslinked rubber having a high hardness.

The carcass 10 is constituted by a carcass ply 30. The carcass ply 30 is laid between the beads 8 on both sides along the insides of the tread 4 and the sidewall 6. The carcass ply 30 is wound from an inside toward an outside in the axial direction around the core 26. An end 32 of the carcass ply 30 reaches the vicinity of the tread 4. The carcass 10 is referred to as a high turn up structure. The carcass ply 30 is constituted by a large number of cords which are provided in parallel and a topping rubber, which is not shown. An absolute value of an angle formed by the cord with respect to the equator plane is usually 75 to 90 degrees. In other words, the tire 2 is a radial tire. The cord of the carcass 10 is usually formed by an organic fiber. Examples of a preferred organic fiber include a polyester fiber, a nylon fiber, a rayon fiber, a polyethylene naphthalate fiber and an aramid fiber.

The load support layer 12 is positioned on an inside in the axial direction of the sidewall 6. The load support layer 12 is interposed between the carcass 10 and the inner liner 18. The load support layer 12 takes a shape which is similar to a crescent. A lower end 34 of the load support layer 12 is positioned on an inside of an upper end 36 of the apex 28 in a radial direction. In other words, the load support layer 12 overlaps with the apex 28. The vicinity of an upper end 38 of the load support layer 12 overlaps with the belt 14. The load support layer 12 is formed by a crosslinked rubber having a great hardness. In the case in which the internal pressure of the tire 2 is reduced due to a puncture, the load support layer 12 supports a weight of a vehicle. Also in the case in which the internal pressure is low, the load support layer 12 can cause the tire 2 to run some distance. The tire 2 is a side reinforcing type run flat tire. The tire may comprise a load support layer taking a different shape from the shape of the load support layer 12 shown in FIG. 1.

The belt 14 is positioned on an outside in the radial direction of the carcass 10. The belt 14 is laminated on the carcass 10. The belt 14 reinforces the carcass 10. The belt 14 is constituted by an inner belt ply 40 and an outer belt ply 42. As is apparent from FIG. 1, the width of the inner belt ply 40 is slightly greater than that of the outer belt ply 42. Each of the inner belt ply 40 and the outer belt ply 42 is constituted by a large number of cords provided in parallel and a topping rubber, which are not shown. The cord is inclined to the equator plane. An absolute value of an inclination angle is usually equal to or greater than 10 degrees and is equal to or smaller than 35 degrees. An angle of the cord of the inner belt ply 40 with respect to the equator plane is reverse to an angle of the cord of the outer belt ply 42 with respect to the equator plane. A preferred material of the cord is steel. An organic fiber may be used for the cord. The belt 14 may include three belt plies or more.

The full band 16 covers a whole surface at an outside in the radial direction of the belt 14. The full band 16 is constituted by a cord and a topping rubber, which are not shown. The cord is extended substantially in a circumferential direction and is wound spirally. The cord has a so-called Pointless structure. The belt 14 is constrained by the cord. The cord of the full band 16 is constituted by an organic fiber or steel. Specific examples of the organic fiber include a nylon fiber, a polyester fiber, a rayon fiber, a polyethylene naphthalate fiber and an aramid fiber. It is also possible to use a so-called hybrid cord which is formed by two types of fibers or more. As will be described below, a cord having a small elongation is preferred for the full band 16. In this respect, it is preferable to use a cord formed by the polyethylene naphthalate fiber, the rayon fiber, the aramid fiber or the steel. It is preferable that the cord should have a density which is equal to or higher than 40 pieces/5 cm and is equal to or lower than 60 pieces/5 cm.

The inner liner 18 forms an inner peripheral surface of the tire 2. The inner liner 18 is formed by a crosslinked rubber. A rubber having a small air transmittance is used for the inner liner 18. The inner liner 18 plays a part in holding the internal pressure of the tire 2.

The chafer 20 is positioned in the vicinity of the bead 8. When the tire 2 is incorporated in a rim, the chafer 20 abuts on the rim. By the abutment, the vicinity of the bead 8 is protected. The chafer 20 is usually constituted by a cloth and a rubber impregnated into the cloth. It is also possible to use the chafer 20 formed by a rubber only.

In a conventional side reinforcing type run flat tire, a relative stiffness is more insufficient in the vicinity of the tread than that in the vicinity of the sidewall. In the side reinforcing type run flat tire 2 according to the present invention, the full band 16 increases the relative stiffness in the vicinity of the tread 4. In the tire 2, the excessively great flexure of the tread 4 is suppressed irrespective of the presence of the load support layer 12. In the tire 2, a proper contact shape can be obtained. The proper contact shape contributes to a handling stability. The proper contact shape also suppresses a partial wear.

In the conventional side reinforcing type run flat tire, a growth in an axial direction is suppressed by the load support layer. Therefore, a profile is permanently distorted. In the side reinforcing type run flat tire 2 according to the present invention, the full band 16 suppresses a growth in a radial direction. Therefore, the distortion of the profile is suppressed. In the tire 2, a CTT profile is not distorted considerably in use for a long period of time. In the tire 2, various performances in the early stage of use can be maintained.

In respect of the suppression of the excessively great flexure of the tread 4 and the suppression of the growth in the radial direction, an elongation Ef of the cord of the full band 16 is preferably equal to or smaller than 3.0%, is more preferably equal to or smaller than 2.7%, and is particularly preferably equal to or smaller than 2.4%. If the elongation Ef is excessively small, a following property to a road surface of the tread 4 is damaged so that the handling stability is inhibited. From this viewpoint, the elongation Ef is preferably equal to or greater than 0.8%, is more preferably equal to or greater than 1.1%, and is particularly preferably equal to or greater than 1.5%. In this specification, the "elongation" indicates an elongation at a load of 50N in a "load-elongation" curve of the cord. The "load-elongation" curve is obtained in accordance with regulations of "A Chemical Fiber Tire Cord Testing Method" of "JIS L1017" in an environment at a room temperature (25° C.). The elongation is measured in a state in which the cord is dry.

A dimension and an angle of each portion of the tire 2 are measured in a state in which the tire 2 is incorporated in a normal rim and is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure. The normal internal pressure of the tire 2 for a passenger car in accordance with the JATMA rules is 180 kPa.

Figure 2:
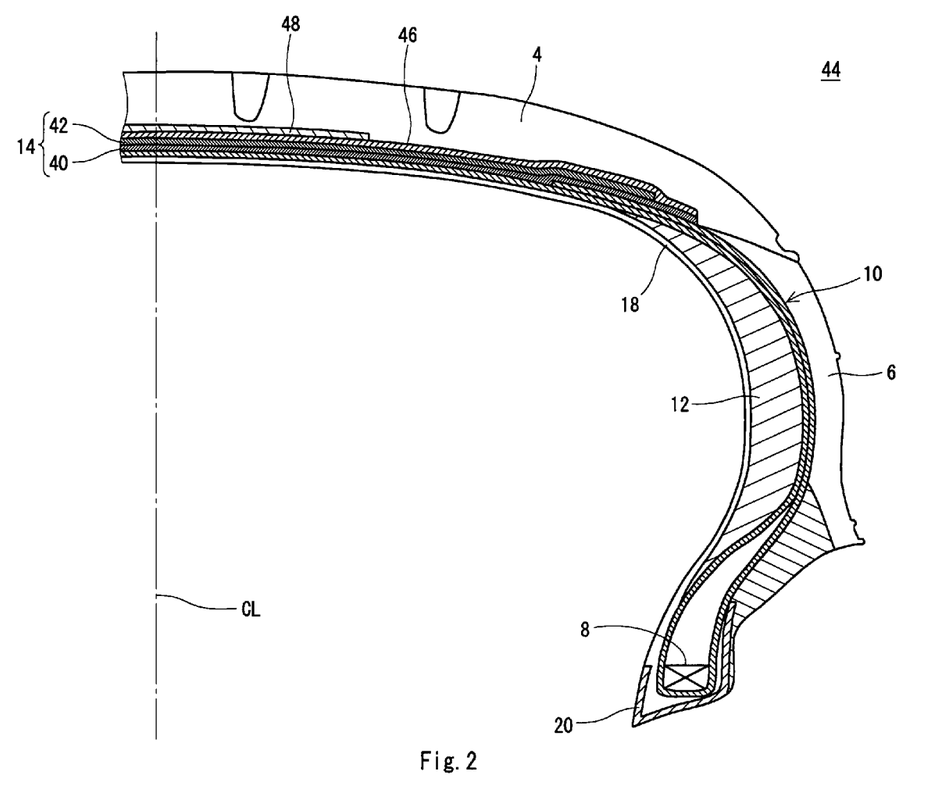
FIG. 2 is a sectional view showing a part of a run flat tire according to another embodiment of the present invention.

FIG. 2 is a sectional view showing a part of a run flat tire 44 according to another embodiment of the present invention. In the same manner as the tire 2 shown in FIG. 1, the tire 44 comprises a tread 4, a sidewall 6, a bead 8, a carcass 10, a load support layer 12, a belt 14, an inner liner 18 and a chafer 20. The tire 44 further comprises a full band 46 and a center band 48.

Figure 3:
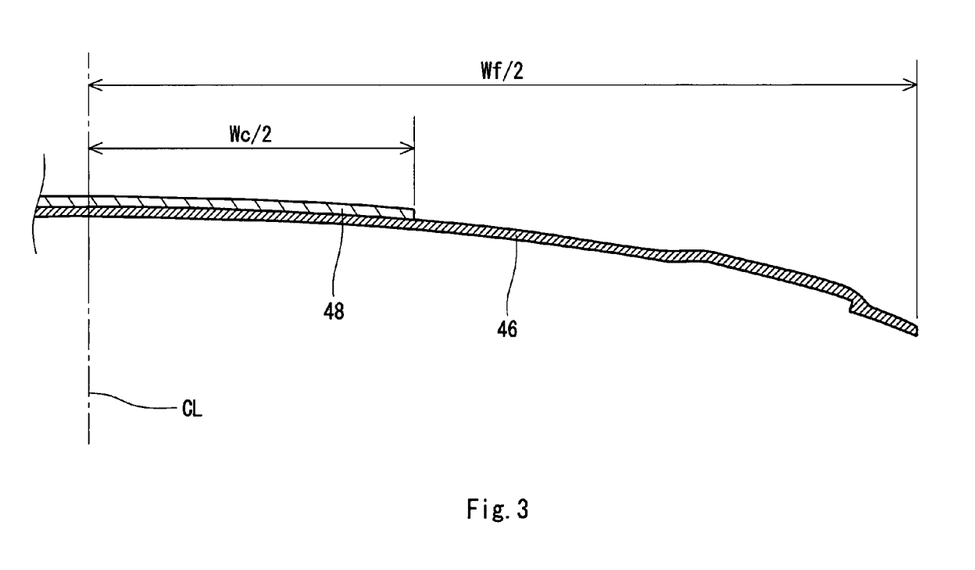
FIG. 3 is an enlarged sectional view showing a full band and a center band in the tire of FIG. 2.

FIG. 3 is an enlarged sectional view showing the full band 46 and the center band 48 in the tire 44 of FIG. 2. A material and a structure of the full band 46 are equivalent to those of the full band 16 of the tire 2 shown in FIG. 1. The center band 48 is constituted by a cord and a topping rubber, which are not shown. The cord is extended substantially in a circumferential direction and is wound spirally. The cord has a so-called jointless structure. The cord is constituted by an organic fiber or steel. Specific examples of the organic fiber include a nylon fiber, a polyester fiber, a rayon fiber, a polyethylene naphthalate fiber and an aramid fiber. It is also possible to use a so-called hybrid cord which is formed by two types of fibers or more.

The center band 48 is laminated on the full band 46. the center band 48 is positioned on an outside in a radial direction of the full band 46. The center band 48 is positioned in the vicinity of an equator CL of the tire 44. The center band 48 constrains the carcass 10 and the belt 14 together with the full band 46. In the tire 44, the full band 46 and the center band 48 enhance a relative stiffness in the vicinity of the tread 4. In the tire 44, the excessively great flexure of the tread 4 is suppressed irrespective of the presence of the load support layer 12. The tire 44 is excellent in a handling stability and an abrasion resistance. In the tire 44, the full band 46 and the center band 48 suppress a growth in the radial direction. Therefore, a permanent distortion of a profile is suppressed. In the tire 44, various performances in the early stage of use are maintained. The center band 48 may be positioned on an inside in the radial direction of the full band 46.

If both the cord of the full band 46 and that of the center band 48 have high moduli of elasticity, a stiffness in the vicinity of the equator CL becomes excessively great. In the tire having an excessively great stiffness, a handling stability is inhibited due to a small contact length of the tread. In the case in which a cord having a high modulus of elasticity is used for the center band in the tire in which the center band is positioned on the outside in the radial direction of the full band, the full band does not sufficiently contribute to a constraint to the belt. From these viewpoints, it is preferable that an elongation Ec (at 50 N) of the cord of the center band 48 should be greater than an elongation Ef (at 50 N) of the cord of the full band 46. A ratio of the elongation Ec to the elongation Ef is preferably equal to or higher than 150% and is more preferably equal to or higher than 200%. The ratio is preferably equal to or smaller than 700%.

As is apparent from FIG. 3, a width Wc of the center band 48 is smaller than a width Wf of the full band 46. In respect of a constraint to the belt 14, a ratio (Wc/Wf) of the width Wc to the width Wf is preferably equal to or higher than 0.20, is more preferably equal to or higher than 0.25, and is particularly preferably equal to or higher than 0.30. In respect of the handling stability, the ratio (Wc/Wf) is preferably equal to or lower than 0.80, is more preferably equal to or lower than 0.75, and is particularly preferably equal to or lower than 0.60. The widths Wc and Wf are measured in an axial direction.

Figure 4:
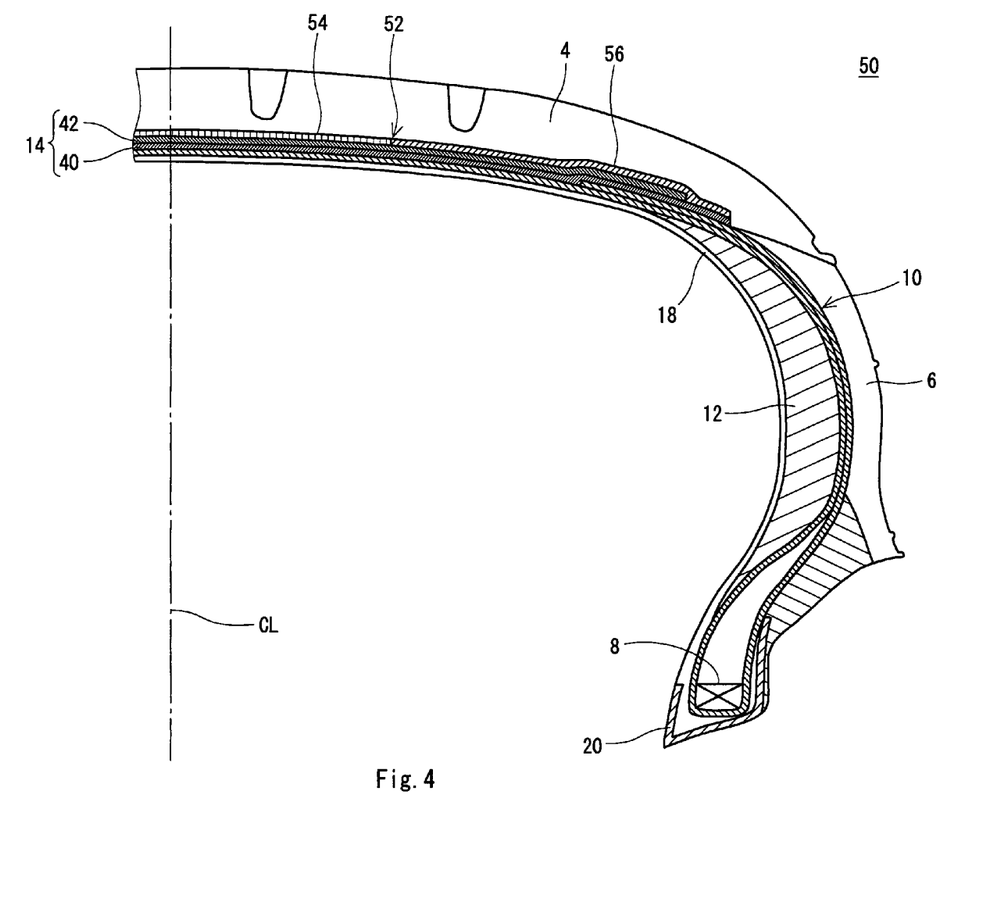
FIG. 4 is a sectional view showing a part of a run flat tire according to a further embodiment of the present invention.

FIG. 4 is a sectional view showing a part of a run flat tire 50 according to a further embodiment of the present invention. In the same manner as the tire 2 shown in FIG. 1, the tire 50 comprises a tread 4, a sidewall 6, a bead 8, a carcass 10, a load support layer 12, a belt 14, an inner liner 18 and a chafer 20. The tire 50 further comprises a full band 52. The full band 52 covers a whole surface on an outside in a radial direction of the belt 14.

Figure 5:
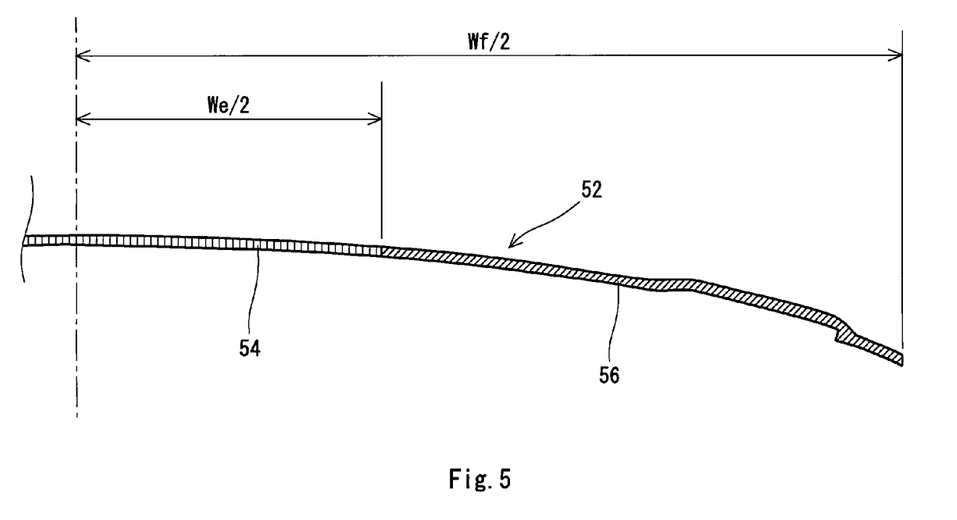
FIG. 5 is an enlarged sectional view showing a full band of the tire in FIG. 4.

FIG. 5 is an enlarged sectional view showing the full band 52 of the tire 50 in FIG. 4. The full band 52 includes an equator portion 54 and a pair of shoulder portions 56. FIG. 5 shows only one of the shoulder portions 56.

The equator portion 54 is positioned in the vicinity of an equator CL. The equator portion 54 is constituted by a cord and a topping rubber. The cord is extended substantially in a circumferential direction and is wound spirally. The cord has a so-called Pointless structure. The cord is constituted by an organic fiber or steel. Specific examples of the organic fiber include a nylon fiber, a polyester fiber, a rayon fiber, a polyethylene naphthalate fiber and an aramid fiber. It is also possible to use a so-called hybrid cord which is formed by two types of fibers or more.

The shoulder portion 56 is linked to the equator portion 54 and is positioned on an outside in an axial direction of the equator portion 54. The shoulder portion 56 is constituted by a cord and a topping rubber. The cord is extended substantially in a circumferential direction and is wound spirally. The cord has a so-called Pointless structure. The cord is constituted by an organic fiber or steel. Specific examples of the organic fiber include a nylon fiber, a polyester fiber, a rayon fiber, a polyethylene naphthalate fiber and an aramid fiber. It is also possible to use a so-called hybrid cord which is formed by two types of fibers or more.

In the tire 50, the full band 52 constrains the carcass 10 and the belt 14. In the tire 50, the full band 52 enhances a relative stiffness in the vicinity of the tread 4. In the tire 50, the excessively great flexure of the tread 4 is suppressed irrespective of the presence of the load support layer 12. The tire 50 is excellent in a handling stability and an abrasion resistance. In the tire 50, the full band 52 suppresses a growth in a radial direction. Therefore, a permanent distortion of a profile is suppressed. In the tire 50, various performances in the early stage of use are maintained.

In the tire 50, an elongation Ee (at 50 N) of the cord of the equator portion 54 is smaller than an elongation Es (at 50 N) of the shoulder portion 56. Consequently, the constraint of the belt 14 and the handling stability are consistent with each other. From this viewpoint, a ratio of the elongation Es to the elongation Ee is preferably equal to or higher than 150% and is more preferably equal to or higher than 200%. The ratio is preferably equal to or lower than 700%. In respect of the constraint of the belt 14, the elongation Ee is preferably equal to or smaller than 3.0%, is more preferably equal to or smaller than 2.7%, and is particularly preferably equal to or smaller than 2.4%. In respect of the handling stability, the elongation Ee is preferably equal to or greater than 0.8%, is more preferably equal to or greater than 1.1% and is particularly preferably equal to or greater than 1.5%.

In respect of the constraint to the belt 14, a ratio (We/Wf) of a width We to a width Wf is preferably equal to or higher than 0.20, is more preferably equal to or higher than 0.25 and is particularly preferably equal to or higher than 0.30. In respect of the handling stability, the ratio (We/Wf) is preferably equal to or lower than 0.80, is more preferably equal to or lower than 0.75 and is particularly preferably equal to or lower than 0.60. As shown in FIG. 5, the widths We and Wf are measured in an axial direction.

EXAMPLES

Experiment 1

Example 1

A run flat tire having the structure shown in FIG. 1 was obtained. The tire comprises a full band. A cord formed by a fine nylon fiber having a small diameter is used for the full band. The cord has a density of 52 pieces/5 cm. The tire has a size of 225/50R17.

Examples 2 to 7

A run flat tire according to each of examples 2 to 7 was obtained in the same manner as that in the example 1 except that a material of a cord was set as shown in the following Table 1.

Comparative Examples 1 to 3

A run flat tire according to each of comparative examples 1 to 3 was obtained in the same manner as that in the example 1 except that a full band was not provided but a so-called edge band covering only the vicinity of an end of a belt was provided and a material of a cord of the edge band was set as shown in the following Table 2.

Comparative Example 4

A run flat tire according to a comparative example 4 was obtained in the same manner as that in the example 1 except that a full band was not provided.

Evaluation

A tire was incorporated into a standard rim and was filled with air to have a standard internal pressure. Then, an outside diameter of the tire was measured. Furthermore, the rim was attached to a passenger car of a front engine rear wheel drive type which has an engine displacement of 3.0 litters. The car was caused to run 100 km over a circuit. In the early stage of the running and immediately before the end of the running, a driver was caused to evaluate a handling stability in an index. Moreover, an outside diameter of the tire was measured after the running and a variation in the outside diameter was thus calculated. These results are shown in the following Tables 1 and 2.

TABLE 1

| | | Result of evaluation | | | | | | |
|---|---|---|---|---|---|---|---|---|
| | | Example 1 | Example 2 | Example 3 | Example 4 | Example 5 | Example 6 | Example 7 |
| Configuration of band | | Full band | Full band | Full band | Full band | Full band | Full band | Full band |
| Band cord | Material | Fine nylon | Thick nylon | Hybrid | PEN | Rayon | Aramid | Steel |
| | Elongation at 50 N (%) | 8.2 | 6.7 | 3.8 | 2.5 | 2.0 | 1.5 | 1.2 |
| Shape of Tire (mm) | Brand-new | 658 | 658 | 657 | 656 | 656 | 655 | 655 |
| | Variation | +1.5 | +1.3 | +1.0 | +1.0 | +1.0 | +0.9 | +0.8 |
| Handling stability (Index) | Brand-new | 95 | 98 | 100 | 100 | 100 | 98 | 95 |
| | After running | −12 | −12 | −10 | −10 | −10 | −8 | −8 |

TABLE 2

|  |  | Comparative Example 1 | Comparative Example 2 | Comparative Example 3 | Comparative Example 4 |
|---|---|---|---|---|---|
|  |  | Result of evaluation | | | |
| Configuration of band | | Edge band | Edge band | Edge band | None |
| Band cord | Material | Fine nylon | Thick nylon | PEN | — |
|  | Elongation at 50 N (%) | 8.2 | 6.7 | 2.5 | — |
| Shape of Tire (mm) | Brand-new | 663 | 663 | 664 | 663 |
|  | Variation | +2.0 | +2.0 | +2.0 | +2.5 |
| Handling stability (Index) | Brand-new | 75 | 80 | 75 | 70 |
|  | After running | −25 | −20 | −20 | −25 |

As shown in the Tables 1 and 2, in each of the tires according to the examples, a variation in an outside diameter is small. In each of the tires according to the examples, moreover, a high handling stability is obtained and an excellent handling stability is maintained.

Experiment 2

Example 8

A run flat tire having the structure shown in FIGS. 2 and 3 was obtained. The tire comprises a full band and a center band. A cord formed by a polyethylene naphthalate (PEN) fiber is used for the full band. The cord of the full band has a density of 50 pieces/5 cm. A cord formed by a thick nylon fiber having a large diameter is used for the center band. The cord of the center band has a density of 46 pieces/5 cm. The tire has the ratio (Wc/Wf) of 0.35. The tire has a size of 225/50R17.

Examples 9, 10 and 17

A run flat tire according to each of examples 9, 10 and 17 was obtained in the same manner as that in the example 8 except that a material of a cord was set as shown in the following Tables 3 and 4.

Examples 11 to 13 and 14 to 16

A run flat tire according to each of examples 11 to 13 and 14 to 16 was obtained in the same manner as that in the example 8 except that the ratio (Wc/Wf) was set as shown in the following Tables 3 and 4.

Comparative Example 5

A run flat tire according to a comparative example 5 was obtained in the same manner as that in the example 8 except that a full band and a center band were not provided.

Evaluation

The tire was evaluated by the same method as that in the experiment 1. Furthermore, the tire was visually observed after running at a distance of 100 km and an abrasion resistance was evaluated in an index. These results are shown in the following Tables 3 and 4.

TABLE 3

|  |  | Example 9 | Example 10 | Example 11 | Example 12 | Example 13 | Example 8 |
|---|---|---|---|---|---|---|---|
|  |  | Result of evaluation | | | | | |
| Cord of full band | Material | Thick nylon | PEN | PEN | PEN | PEN | PEN |
|  | Elongation at 50 N (%) | 6.7 | 2.5 | 2.5 | 2.5 | 2.5 | 2.5 |
| Cord of center band | Material | Thick nylon | PEN | Thick nylon | Thick nylon | Thick nylon | Thick nylon |
|  | Elongation at 50 N (%) | 6.7 | 2.5 | 6.7 | 6.7 | 6.7 | 6.7 |
| Wc/Wf |  | 0.35 | 0.35 | 0.10 | 0.20 | 0.25 | 0.35 |
| Shape of Tire (mm) | Brand-new | 657 | 656 | 656 | 656 | 656 | 656 |
|  | Variation | +1.0 | +0.7 | +0.9 | +0.9 | +0.8 | +0.7 |
| Handling stability (Index) | Brand-new | 105 | 100 | 100 | 100 | 100 | 100 |
|  | Variation | −8 | −6 | −6 | −5 | −2 | −2 |
| Abrasion resistance (Index) |  | 105 | 95 | 102 | 105 | 110 | 110 |

TABLE 4

Result of evaluation

|  |  | Example 14 | Example 15 | Example 16 | Example 17 | Comparative Example 5 |
|---|---|---|---|---|---|---|
| Cord of full band | Material | PEN | PEN | PEN | Thick nylon | None |
|  | Elongation at 50 N (%) | 2.5 | 2.5 | 2.5 | 6.7 | — |
| Cord of center band | Material | Thick nylon | Thick nylon | Thick nylon | PEN | None |
|  | Elongation at 50 N (%) | 6.7 | 6.7 | 6.7 | 2.5 | — |
| Wc/Wf |  | 0.50 | 0.75 | 0.80 | 0.35 | — |
| Shape of Tire (mm) | Brand-new | 656 | 656 | 656 | 656 | 663 |
|  | Variation | +0.7 | +0.6 | +0.6 | +0.9 | +2.5 |
| Handling stability (Index) | Brand-new | 100 | 100 | 100 | 100 | 70 |
|  | Variation | −2 | −5 | −6 | −6 | −25 |
| Abrasion resistance (Index) |  | 108 | 109 | 108 | 100 | 85 |

As shown in the Tables 3 and 4, in each of the tires according to the examples, a variation in an outside diameter is small. In each of the tires according to the examples, moreover, a high handling stability is obtained and an excellent handling stability is maintained. Furthermore, each of the tires according to the examples also has an excellent abrasion resistance.

Experiment 3

Example 18

A run flat tire having the structure shown in FIGS. 4 and 5 was obtained. The tire comprises a full band. The full band is constituted by an equator portion and a pair of shoulder portions. A cord formed by a polyethylene naphthalate (PEN) fiber is used for the equator portion. The cord of the equator portion has a density of 50 pieces/5 cm. A cord formed by a thick nylon fiber having a large diameter is used for the shoulder portion. The cord of the shoulder portion has a density of 46 pieces/5 cm. The tire has the ratio (We/Wf) of 0.35. The tire has a size of 225/50R17.

Examples 19, 20 and 27

A run flat tire according to each of examples 19, 20 and 27 was obtained in the same manner as that in the example 18 except that a material of a cord was set as shown in the following Tables 5 and 6.

Examples 21 to 23 and 24 to 26

A run flat tire according to each of examples 21 to 23 and 24 to 26 was obtained in the same manner as that in the example 18 except that (We/Wf) was set as shown in the following Tables 5 and 6.

Comparative Example 6

A run flat tire according to a comparative example 6 was obtained in the same manner as that in the example 18 except that a full band and a center band were not provided.

Evaluation

The tire was evaluated by the same method as that in the experiment 1. This result is shown in the following Tables 5 and 6.

TABLE 5

Result of evaluation

|  |  | Example 19 | Example 20 | Example 21 | Example 22 | Example 23 | Example 18 |
|---|---|---|---|---|---|---|---|
| Cord of equator portion | Material | Thick nylon | PEN | PEN | PEN | PEN | PEN |
|  | Elongation at 50 N (%) | 6.7 | 2.5 | 2.5 | 2.5 | 2.5 | 2.5 |
| Cord of shoulder portion | Material | Thick nylon | PEN | Thick nylon | Thick nylon | Thick nylon | Thick nylon |
|  | Elongation at 50 N (%) | 6.7 | 2.5 | 6.7 | 6.7 | 6.7 | 6.7 |
| We/Wf |  | 0.35 | 0.35 | 0.10 | 0.20 | 0.25 | 0.35 |
| Shape of Tire (mm) | Brand-new | 657 | 656 | 657 | 657 | 656 | 656 |
|  | Variation | +1.2 | +0.8 | +1.0 | +1.0 | +0.9 | +0.7 |
| Handling stability (Index) | Brand-new | 100 | 95 | 95 | 95 | 95 | 95 |
|  | Variation | −12 | −10 | −5 | −4 | −2 | −2 |

TABLE 6

Result of evaluation

| | | Example 24 | Example 25 | Example 26 | Example 27 | Comparative Example 6 |
|---|---|---|---|---|---|---|
| Cord of equator portion | Material | PEN | PEN | PEN | Thick nylon | None |
| | Elongation at 50 N (%) | 2.5 | 2.5 | 2.5 | 6.7 | — |
| Cord of shoulder portion | Material | Thick nylon | Thick nylon | Thick nylon | PEN | None |
| | Elongation at 50 N (%) | 6.7 | 6.7 | 6.7 | 2.5 | — |
| Wc/Wf | | 0.50 | 0.75 | 0.80 | 0.35 | — |
| Shape of Tire (mm) | Brand-new | 656 | 656 | 656 | 657 | 663 |
| | Variation | +0.7 | +0.7 | +0.6 | +1.1 | +2.5 |
| Handling stability (Index) | Brand-new | 95 | 95 | 95 | 95 | 70 |
| | Variation | −2 | −6 | −6 | −6 | −25 |

As shown in the Tables 5 and 6, in each of the tires according to the examples, a variation in an outside diameter is small. In each of the tires according to the examples, moreover, a high handling stability is obtained and an excellent handling stability is maintained. From the results of the evaluations described above, the advantages of the present invention are apparent.

The run flat tire according to the present invention can be attached to various vehicles. The above description is only illustrative and various changes can be made without departing from the scope of the present invention.

What is claimed is:

1. A run flat tire comprising:
   a tread having an external surface forming a tread surface;
   a pair of sidewalls extended almost inward in a radial direction from an end of the tread;
   a pair of beads positioned on an almost inside in a radial direction of the sidewalls;
   a carcass laid between both of the beads along insides of the tread and the sidewalls;
   a load support layer positioned on an inside in an axial direction of the sidewalls;
   a belt formed by two belt plies or more and positioned on an outside in a radial direction of the carcass in the vicinity of the tread; and
   a full band covering a whole surface on an outside in a radial direction of the belt, and constituted by a cord and a topping rubber, wherein the cord of the full band is constituted by an organic fiber; and
   a center band having a smaller width in an axial direction than a center width in an axial direction of the full band, laminated on the full band, overlapping an equator of the tire, and constituted by a cord and a topping rubber, wherein the center band is positioned on an outside in the radial direction of the full band, and an elongation of the cord of the center band is greater than an elongation of the cord of the full band.

2. The run flat tire according to claim 1, wherein the cord of the full band has an elongation of 3.0% or less when a tensile load of 50N is applied.

3. The run flat tire according to claim 1, wherein a ratio (Wc/Wf) of a width Wc of the center band to a width Wf of the full band is equal to or higher than 0.20 and is equal to or lower than 0.80.

4. The run flat tire according to claim 1, wherein the tread includes a profile which has a radius of curvature decreased gradually from an equator outward in an axial direction.

5. The run flat tire according to claim 1, wherein the center band is centered on the equator of the tire.

6. The run flat tire according to claim 1, wherein the cord of the full band is extended in a circumferential direction and is wound spirally.

* * * * *